W. M. FULLER.
STEAM-TRAP.

No. 178,285. Patented June 6, 1876.

Witnesses:
C. Dieterich.
Wm. Bufferman.

Inventor:
Willard M. Fuller
Per: C. H. Watson & Co. Attorneys.

UNITED STATES PATENT OFFICE.

WILLARD M. FULLER, OF NEW YORK, ASSIGNOR TO HIMSELF AND JOHN SHERRY, OF BROOKLYN, NEW YORK.

IMPROVEMENT IN STEAM-TRAPS.

Specification forming part of Letters Patent No. 178,285, dated June 6, 1876; application filed May 10, 1876.

*To all whom it may concern:*

Be it known that I, WILLARD M. FULLER, of New York, in the county of New York and State of New York, have invented certain new and useful Improvements in Steam-Traps; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a steam-trap, in which the steam in the trap acts upon a pipe containing water for the purpose of opening and closing a valve in the steam-pipe, as will be hereinafter more fully set forth.

Figure 1:
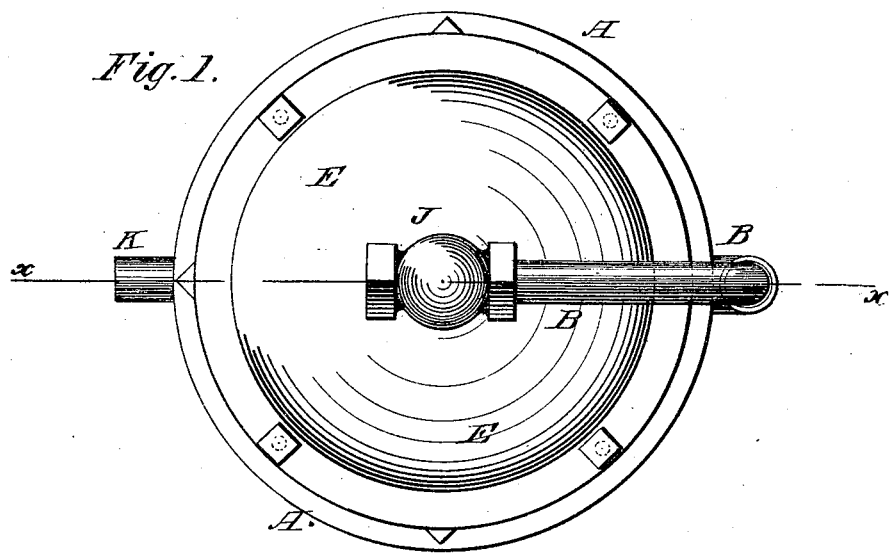
Figure 2:
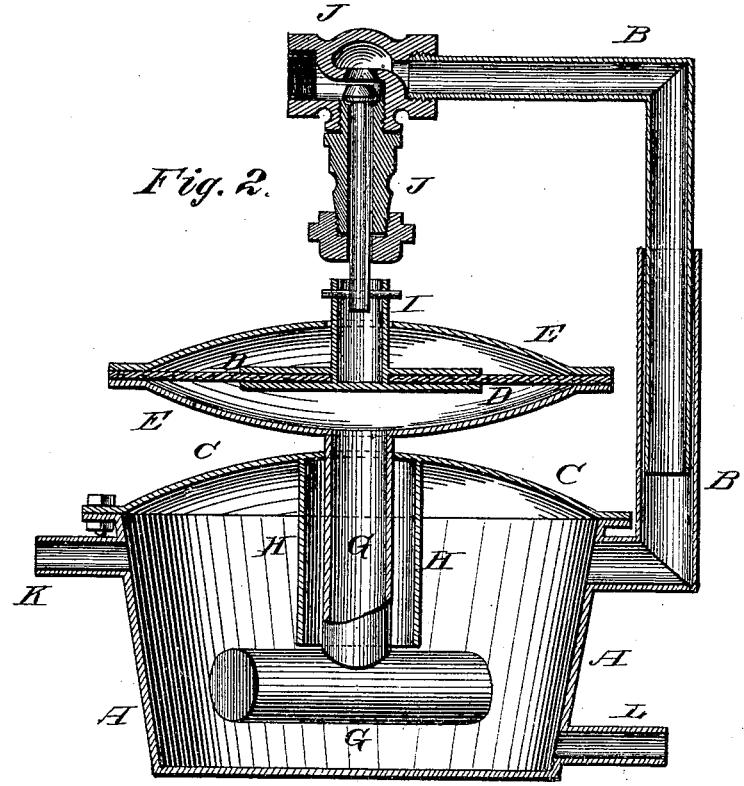

In the annexed drawing, Figure 1 is a plan view, and Fig. 2 is a central vertical section on line $x\ x$, Fig. 1.

A represents the body of the trap, which may be made of any form desired, and is to be placed above the boiler. B is the steam-pipe entering the trap near the top. C is the lid or top of the trap, on the top of which is secured the case E, provided with an interior diaphragm, D. From the bottom of the case E extends a T-shaped pipe, G, nearly down to the bottom of the trap A, the ends of said pipe being capped. The vertical part of the pipe G is surrounded by a shield, H, which prevents the steam from coming in contact with the pipe until the water has been forced below said shield. From the center of the diaphragm D, within the case E, projects a tube or rod, I, which connects with the valve-stem of the valve J in the pipe B. The pipe G is filled with water, and the diaphragm D is put in its place. It hermetically seals this water in the pipe. Now, when steam is let into the trap or cylinder A, it generates steam from the water that is confined in the pipe G, and creates a pressure under the diaphragm, which rises and closes the steam-valve J. The steam in the trap will then condense and form a vacuum, which will fill with water through the water-entrance K. The water then surrounding the pipe G will then condense the steam therein, and form a vacuum under the diaphragm, whereby the diaphragm is drawn down, opening the steam-valve again to let in the steam on top of the water, and equalize the pressure in the boiler. The water will then flow into the boiler through the pipe L. Suitable check-valves are to be arranged in the inlet and discharge pipes. The diaphragm D may be placed in any position, and may be made of rubber or metal; or the pressure may be made to act on a piston or plunger in the same manner.

Having thus fully described my invention, what I claim as new, and desire to secure by Letters Patent, is—

1. In a steam-trap, the combination of the trap A, pipe G, connected with vessel E, shield H, and diaphragm D, substantially as described.

2. The combination of the trap A, case E, with diaphragm D, sealed pipe G, rod I, steam-pipe B, with valve J, and water-pipes K L, substantially as and for the purposes set forth.

In testimony that I claim the foregoing as my own I affix my signature in presence of two witnesses.

WILLARD M. FULLER.

Witnesses:
GEORGE B. GIBBS,
SAML. T. KENNEDY.